(12) United States Patent
Lee et al.

(10) Patent No.: US 9,330,248 B2
(45) Date of Patent: May 3, 2016

(54) USER AUTHENTICATION APPARATUS OF PORTABLE TERMINAL

(71) Applicant: ELECTRONICS AND TELECOMMUNCATIONS RESEARCH INSTITUTE, Daejeon (KR)

(72) Inventors: Yun-Kyung Lee, Daejeon (KR); Jae Deok Lim, Daejeon (KR); Young Ho Kim, Daejeon (KR); Jeong Nyeo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 66 days.

(21) Appl. No.: 14/079,096

(22) Filed: Nov. 13, 2013

(65) Prior Publication Data

US 2014/0150084 A1    May 29, 2014

(30) Foreign Application Priority Data

Nov. 26, 2012    (KR) .......................... 10-2012-0134567

(51) Int. Cl.
*G06F 21/31* (2013.01)
*G06F 21/36* (2013.01)

(52) U.S. Cl.
CPC ............. *G06F 21/36* (2013.01); *G06F 21/31* (2013.01)

(58) Field of Classification Search
CPC .................. G06F 21/31; G06F 21/36
USPC ............................................... 726/16
See application file for complete search history.

(56) References Cited

U.S. PATENT DOCUMENTS

| | | | | |
|---|---|---|---|---|
| 7,007,168 | B2 * | 2/2006 | Kubo ................. | G06F 3/0488 345/173 |
| 7,705,829 | B1 * | 4/2010 | Plotnikov ............ | G06F 3/0236 341/22 |
| 8,146,011 | B2 * | 3/2012 | Lu ...................... | G06F 3/0481 345/156 |
| 8,826,029 | B2 * | 9/2014 | Cheng ................ | G06F 21/32 713/182 |
| 2001/0005887 | A1 * | 6/2001 | Boroditsky et al. .......... 713/183 | |
| 2010/0058057 | A1 * | 3/2010 | Sutherland et al. .......... 713/168 | |
| 2011/0145820 | A1 | 6/2011 | Pratt et al. | |
| 2011/0191591 | A1 * | 8/2011 | Cheng et al. ................ 713/182 | |
| 2013/0047237 | A1 * | 2/2013 | Ahn et al. ...................... 726/7 | |

FOREIGN PATENT DOCUMENTS

| | | |
|---|---|---|
| KR | 10-0735727 | 6/2007 |
| KR | 10-2010-0023635 | 3/2010 |
| KR | 10-0996955 | 11/2010 |

* cited by examiner

*Primary Examiner* — Linglan Edwards
(74) *Attorney, Agent, or Firm* — Staas & Halsey LLP

(57) ABSTRACT

A user authentication apparatus safely uses resources by forming a communication channel between a plurality of execution environments through user authentication in a portable terminal providing the plurality of execution environments based on a virtualization solution, and prevents private information from being illegally leaked by hacking by not directly exposing a PIN number or a password a user inputs using a virtual keyboard and a keyboard coordinate when authenticating the user.

10 Claims, 3 Drawing Sheets

USER AUTHENTICATION APPARATUS OF PORTABLE TERMINAL

RELATED APPLICATIONS(S)

This application claims the benefit of Korean Patent Application No. 10-2012-0134567, filed on 26 Nov. 2012, which is hereby incorporated by references as if fully set forth herein.

FIELD OF THE INVENTION

The present invention relates to a user authentication apparatus of a portable terminal, and more particularly, to a user authentication apparatus capable of safely using resources by forming a communication channel between a plurality of execution environments through user authentication in a portable terminal providing the plurality of execution environments based on a virtualization solution, and preventing private information from being illegally leaked by hacking by not directly exposing a PIN number or a password a user inputs using a virtual keyboard and a keyboard coordinate when authenticating the user.

BACKGROUND OF THE INVENTION

Recently, users of portable terminals such as a smart phone, a smart pad, a notebook, a personal digital assistant (PDA), and the like are increasing. Thus, applications usable in a portable terminal are diversifying, and applications using private and business information are also increasing. However, since an application is executed with an open type operating system, it has an increased risk of hacking. To solve this problem, a scheme of separating execution regions of each application by applying a virtualization solution to a portable terminal is offered.

SUMMARY OF THE INVENTION

As described above, a conventional portable terminal provides a virtualization solution that provides separate execution regions. However, in case of simply separating the execution regions, data stored in one execution region may not be used in another execution region, or resources of the portable terminal may not be used effectively, so that the inconvenience of a user increases.

It is, therefore, an object of the present invention to provide a portable terminal capable of improving the convenience of a user by providing separate execution regions, enabling data exchange between the separate execution regions, and allowing an application to use another execution region.

Another object of the present invention is to provide a portable terminal capable of maintaining security by authenticating a user and an application and permitting access only to the authenticated user and application while execution regions communicate with each other. In particular, the present invention provides an apparatus for authenticating a user and an application.

In accordance with an aspect of the present invention, there is provided a user authentication device of a portable terminal that provides a plurality of execution environments where at least one application is executed, the device including an authentication information input unit configured to provide a virtual keyboard in response to a user authentication request and generate authentication data using coordinate data inputted through the virtual keyboard, and an authentication information processing unit configured to approve the authentication data, wherein the plurality of execution environments shares keyboard coordinates of the virtual keyboard.

The authentication information input unit may provide the virtual keyboard according to a keyboard map that is exchanged in advance between the plurality of execution environments or a keyboard map transmitted from an execution region of an application that has generated the user authentication request. The authentication information input unit may include a keyboard map generator configured to generate a keyboard map as being synchronized between the plurality of execution environments.

The virtual keyboard may include a plurality of keypad regions, and the coordinate data represents a coordinate of a keypad region selected from the plurality of keypad regions. The authentication information input unit may generate the authentication data based on identification data of the virtual keyboard, reference data representing reference directions of the keyboard coordinates, and the coordinate data.

Each of the keyboard coordinates may include an X coordinate and a Y coordinate, and the reference data may define an order of the X coordinate and the Y coordinate. The authentication data may have an order of the identification data, the reference data, and the coordinate data. The authentication information processing unit may perform a logical add operation on the coordinate data and random data. Herein, the random data may be generated in the execution region of the application that has generated the user authentication request.

In accordance with embodiments of the present invention, it is possible to achieve effects of safely using resources by forming a communication channel between a plurality of execution environments through user authentication in a portable terminal providing the plurality of execution environments based on a virtualization solution, and preventing private information from being illegally leaked by hacking by not directly exposing a PIN number or a password a user inputs using a virtual keyboard and a keyboard coordinate when authenticating the user.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Hereinafter, embodiments of the present invention will be described in detail with reference to the accompanying drawings so that they can be readily implemented by those skilled in the art.

Figure 1:
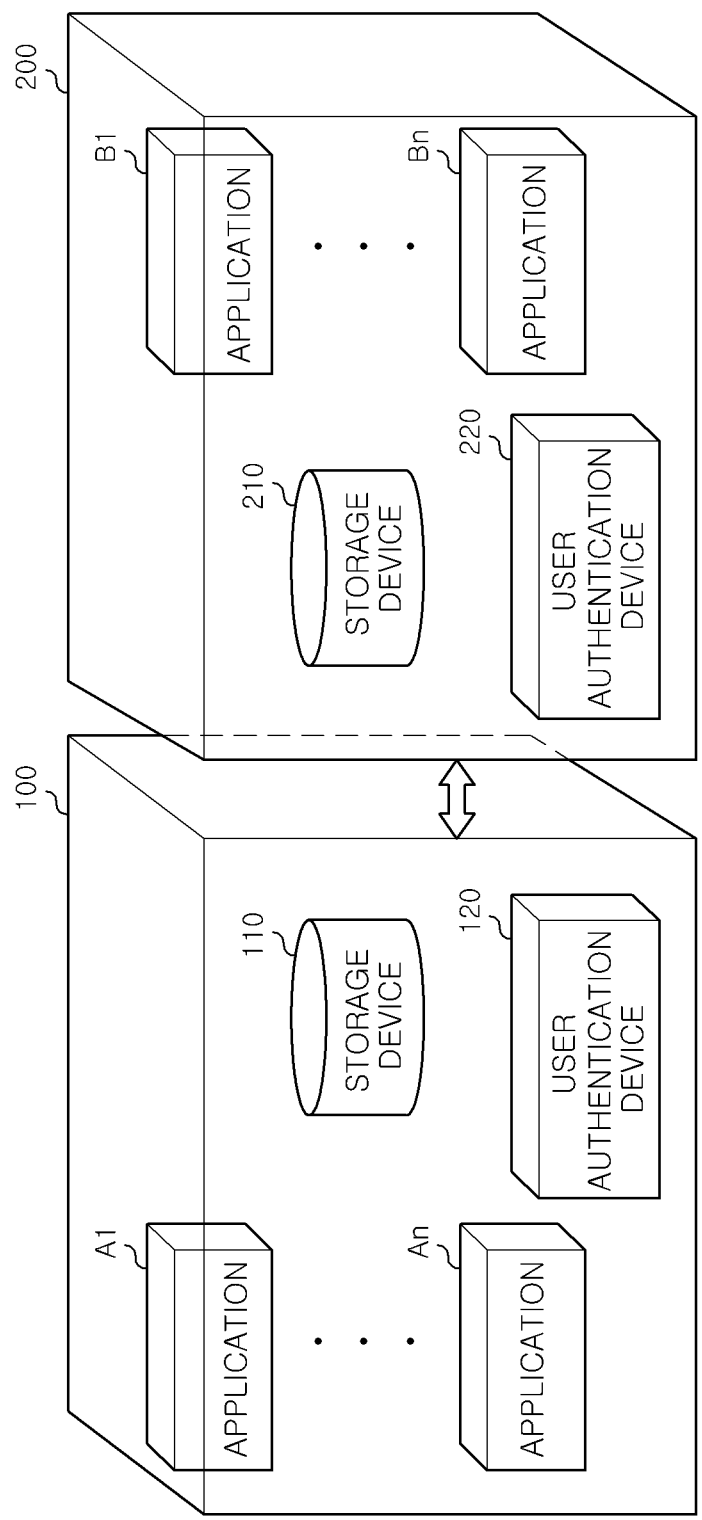
FIG. 1 is a conceptual block diagram illustrating a portable terminal in accordance with an embodiment of the present invention.

FIG. 1 is a conceptual block diagram illustrating a portable terminal in accordance with an embodiment of the present invention.

Referring to FIG. 1, the portable terminal provides first and second execution environments 100 and 200, which are separate from each other by applying a virtualization solution. Herein, the portable terminal includes a plurality of applications A1~An, a storage device 110, and a user authentication device 120, which are executed in the first execution environment 100. The portable terminal further includes a plurality of applications B1~Bn, a storage device 210, and a user authentication device 220, which are executed in the second execution environment 200. The first and second execution environments 100 and 200 can communicate with each other. If a communication channel is established between execution regions of the applications A1~An and B1~Bn, it is possible to use resources of the first and second execution environments 100 and 200. Herein, the user authentication is performed using the user authentication devices 120 and 220 before the communication channel is established, so that an authenticated user only can use the communication channel. For this purpose, each of the user authentication devices 120 and 220 authenticates a user by exchanging a virtual keyboard and a keyboard coordinate between the first and second execution environments 100 and 200 if one of applications executed in one of the first and second execution environments 100 and 200 requests the user authentication to use resources of the other of the first and second execution environments 100 and 200. This will be described in detail with reference to FIG. 2.

Figure 2:
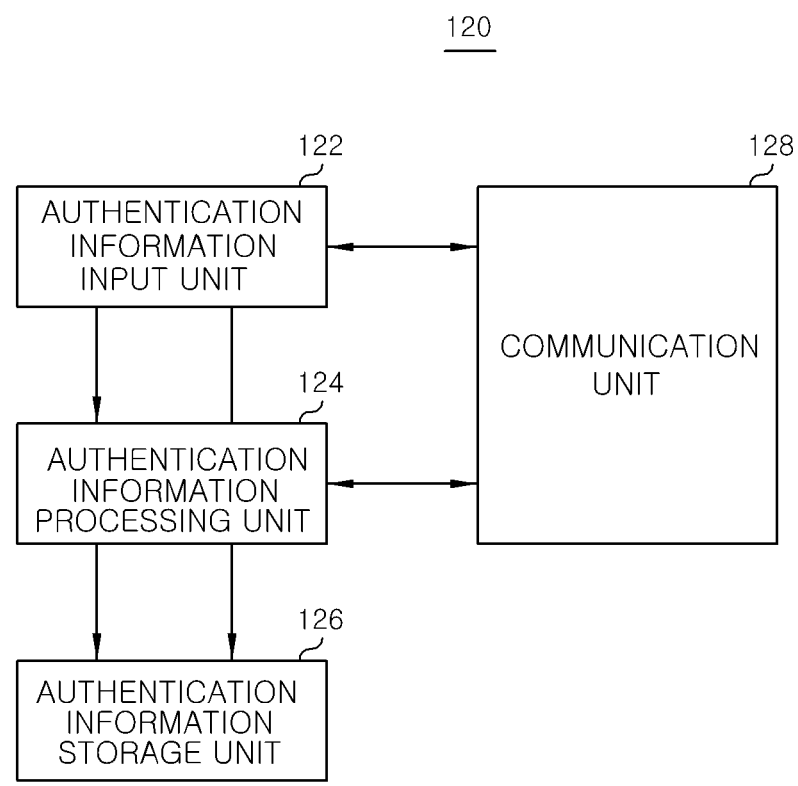
FIG. 2 illustrates a detailed block diagram of a user authentication device shown in FIG. 1.
Figure 3:
FIG. 3 is a view illustrating a virtual keyboard in accordance with an embodiment of the present invention.
Figure 4:
FIG. 4 is a view illustrating authentication data in accordance with an embodiment of the present invention.

FIG. 2 illustrates a detailed block diagram of the user authentication device 120 shown in FIG. 1. FIG. 3 is a view illustrating a virtual keyboard in accordance with an embodiment of the present invention. FIG. 4 is a view illustrating authentication data in accordance with an embodiment of the present invention.

Referring to FIG. 2, the user authentication device 120 includes an authentication information input unit 122, an authentication information processing unit 124, an authentication information storage unit 126, and a communication unit 128. Herein, since a detailed configuration of the user authentication device 220 is substantially the same as that of the user authentication device 120, the description thereof is omitted for the simplicity of explanation.

The authentication information input unit 122 provides a screen of the portal terminal with a virtual keyboard corresponding to a keyboard map in response to a user authentication request. Herein, the keyboard map may be exchanged in advance between the first and second execution environments 100 and 200, and stored in the authentication information storage unit 126. In this case, an execution region of an application that has generated the user authentication request and an execution region of an application that has received the user authentication request may share the same keyboard coordinate.

The present invention is not limited thereto. In accordance with another embodiment, the authentication information input unit 122 may include a keyboard map generator for generating the keyboard map. In this case, the authentication information input unit 122 may further include a synchronization unit for synchronizing the keyboard map generation between the execution region of the application that has generated the user authentication request and the execution region of the application that has received the user authentication request. In addition, the execution region of the application that has generated the user authentication request may transmit the keyboard map to the application that has received the user authentication request.

The user may input a personal identification number (PIN) or a password using the virtual keyboard according to a touch scheme or a key input scheme using a mouse or a keyboard. In accordance with an embodiment of the present invention, the virtual keyboard may include a plurality of keypad regions corresponding to X and Y keyboard coordinates, as shown in FIG. 3.

For instance, if a horizontal direction of a screen 10 of the portable terminal is a Y-axis direction and a vertical direction thereof is an X-axis direction, keypad coordinates corresponding to the keypad regions may be defined as (0,0), (0,1), (0,2), (1,0), (1,1), (1,2), (2,0), (2,1), (2,2), (3,0), (3,1), and (3,2). According to this embodiment, the number of the keypad regions is 3*4, but the present invention is not limited thereto. The virtual keyboard may include 4*4 or more keypad regions.

The authentication information input unit 122 generates authentication data by combining coordinate data input through the virtual keyboard, identification data of the virtual keyboard, and reference data representing a reference direction of the keyboard coordinates. Herein, the coordinate data represents a coordinate of a keypad region selected by the user. The identification data of the virtual keyboard represents a number for identifying a keypad when the keypad is generated. The reference data represents an order of X and Y coordinates of a keyboard coordinate.

In particular, a case that an identification number of the virtual keyboard is 2 and 0~9 are generated in the keypad regions as shown in FIG. 4 will be described as an example. Moreover, assuming that a horizontal direction and a vertical direction of the screen 10 of the portable terminal, which are the Y-axis direction and the X-axis direction, respectively, are determined as reference directions, the reference data is set to 0 if an X axis and a Y axis of the virtual keyboard correspond to the reference directions, and the reference data is set to 1 if the X axis and the Y axis are opposite to the reference directions. It is also assumed that the PIN number is input through the virtual keyboard in an order of 1, 2, 3, and 4.

In this case, a coordinate corresponding to 1 is (1,1); a coordinate corresponding to 2 is (2,0); a coordinate corresponding to 3 is (3,1); and a coordinate corresponding to 4 is (3,2). The authentication data is generated in an order of the identification data, the reference data, and the coordinate data, that is, 2|0|11|20|31|32. Meanwhile, if the X axis and the Y axis of the virtual keyboard are opposite to the reference directions, the authentication data is generated as 2|1|11|02|13|23. The embodiment of the present invention is described by taking a case that the virtual keyboard provides numbers as an example, but the present invention is not limited thereto. In accordance with another embodiment, the virtual keyboard may provide letters, symbols, or the like.

Referring back to FIG. 2, the authentication information processing unit 124 approves the user using the authentication data. More specifically, the authentication information processing unit 124 compares the authentication data with approval data that is pre-stored in the authentication information storage unit 126 and determines whether or not the authentication data is identical to the approval data. As a result of the determination, if the authentication data is determined to be identical to the approval data, the authentication information processing unit 124 approves the user.

In addition, the authentication information processing unit 124 may generate random data and transmit the same to the execution region of the application that has generated the user authentication request. In this case, the execution region, which receives the random data, may perform a logical combination, e.g., an XOR operation, on the random data and the coordinate data, and transmit the authentication data.

As described above, the user authentication apparatus in accordance with an embodiment of the present invention can safely use resources by forming a communication channel between a plurality of execution environments through user authentication in a portable terminal providing the plurality of execution environments based on a virtualization solution. In addition, it can prevent private information from being illegally leaked by hacking by not directly exposing a PIN number or a password a user inputs using the virtual keyboard and the keyboard coordinate when authenticating the user.

Moreover, by performing the XOR operation on the coordinate data and the random data generated in the execution region of the application that has received the user authentication request and transmitting the XOR operation result, it is possible to prevent an attack where the PIN number or password of the user is re-transmitted. Since the keyboard coordinate of the present invention changes whenever the user inputs the PIN number or password, it is possible to prevent the re-transmission attack even though the random data is not used. In addition, it is possible to enhance the security by providing variously combined keyboard coordinates by reversing an order of X and Y keyboard coordinates.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A user authentication device of a portable terminal that provides a plurality of execution environments wherein at least one application is executable in a first of the plurality of execution environments and at least another application is executable in a second of the plurality of execution environments, the device comprising:
    an authentication information input unit configured to provide a virtual keyboard in response to a user authentication request and generate authentication data using coordinate data inputted through the virtual keyboard; and
    an authentication information processing unit configured to approve the authentication data,
    wherein same keyboard coordinates of the virtual keyboard are shared by the first and the second of the plurality of execution environments in response to the execution of the at least one of the applications in the first of the plurality of execution environments requesting to use a resource of the second of the plurality of execution environments,
    wherein the same keyboard coordinates of the virtual keyboard are changed in response to the user inputting at least one of a personal identification number (PIN) and a password,
    wherein the authentication information input unit is configured to generate the authentication data based on identification data of the virtual keyboard, reference data representing reference directions of the keyboard coordinates, and the coordinate data.

2. The user authentication device of claim 1, wherein the authentication information input unit is configured to provide the virtual keyboard according to a keyboard map that is exchanged in advance between at least some of the plurality of execution environments or a keyboard map transmitted from an execution region of an application that has generated the user authentication request.

3. The user authentication device of claim 1, wherein the authentication information input unit comprises a keyboard map generator configured to generate a keyboard map as being synchronized between at least some of the plurality of execution environments.

4. The user authentication device of claim 1, wherein the virtual keyboard includes a plurality of keypad regions, and the coordinate data represents a coordinate of a keypad region selected from at least some of the plurality of keypad regions.

5. The user authentication device of claim 1, wherein each of the keyboard coordinates comprises an X coordinate and a Y coordinate, and the reference data defines an order of the X coordinate and the Y coordinate.

6. The user authentication device of claim 1, wherein the authentication data has an order of the identification data, the reference data, and the coordinate data.

7. The user authentication device of claim 1, wherein the authentication information processing unit is configured to perform a logical add operation on the coordinate data and random data.

8. The user authentication device of claim 7, wherein the random data is generated in the execution region of the application that has generated the user authentication request.

9. The user authentication device of claim 1, wherein an order of X and Y keyboard coordinates are reversed based on the user input.

10. A method of user authentication of a portable terminal that provides a plurality of execution environments wherein at least one application is executable in a first of the plurality of execution environments and at least another application is executable in a second of the plurality of execution environments, the method comprising:
    generating a user request for authentication; and
    exchanging a virtual keyboard and keyboard coordinates between the first and the second of the plurality of execution environments in response to an execution of the at least one of the applications in the first of the plurality of execution environments requesting to use a resource of the second of the plurality of execution environments,
    wherein an execution region of the at least one of the applications that has generated the user authentication request and an execution region of the least another application to receive the user authentication request share same keyboard coordinates,
    wherein the keyboard coordinates of the virtual keyboard are changed in response to the user inputting at least one of a personal identification number (PIN) and a password.

* * * * *